(12) United States Patent
Reuter et al.

(10) Patent No.: US 7,624,570 B2
(45) Date of Patent: Dec. 1, 2009

(54) OPTIMAL FUEL PROFILES

(75) Inventors: Johannes Walter Reuter, Ypsilanti, MI (US); Subbaraya Radhamohan, Novi, MI (US); Dmitry Arie Shamis, Commerce Twp, MI (US); Christian Thomas Chimner, Royal Oaks, MI (US)

(73) Assignee: Eaton Corporation, Cleveland, OH (US)

( * ) Notice: Subject to any disclaimer, the term of this patent is extended or adjusted under 35 U.S.C. 154(b) by 448 days.

(21) Appl. No.: 11/494,372

(22) Filed: Jul. 27, 2006

(65) Prior Publication Data

US 2008/0022664 A1 Jan. 31, 2008

(51) Int. Cl.
*F01N 3/00* (2006.01)
(52) U.S. Cl. ............................ 60/286; 60/274; 60/285; 60/295; 60/301; 60/303; 48/197 R
(58) Field of Classification Search ................ 60/274, 60/285, 286, 295, 297, 301, 303; 48/197 R
See application file for complete search history.

(56) References Cited

U.S. PATENT DOCUMENTS

| | | | |
|---|---|---|---|
| 5,778,667 A | | 7/1998 | Kinugasa et al. |
| 6,553,757 B1 * | | 4/2003 | Surnilla et al. ................ 60/285 |
| 6,732,507 B1 | | 5/2004 | Stanglmaier et al. |
| 6,758,036 B1 | | 7/2004 | Molinier |
| 6,763,657 B2 * | | 7/2004 | Wachi et al. .................. 60/285 |
| 6,854,264 B2 * | | 2/2005 | Elwart et al. .................. 60/285 |
| 7,246,486 B2 * | | 7/2007 | Nakagawa et al. ............. 60/285 |
| 7,386,977 B2 * | | 6/2008 | Ancimer et al. ............... 60/286 |
| 2003/0101713 A1 | | 6/2003 | Betta et al. |
| 2003/0140622 A1 | | 7/2003 | Taylor, III et al. |
| 2004/0050037 A1 | | 3/2004 | Betta et al. |
| 2004/0076565 A1 | | 4/2004 | Gandhi et al. |
| 2005/0022450 A1 * | | 2/2005 | Tan et al. .................... 48/198.3 |
| 2007/0130915 A1 | | 6/2007 | Beckmann |

FOREIGN PATENT DOCUMENTS

| | | |
|---|---|---|
| DE | 102004018393 A1 * | 11/2005 |
| WO | WO 2004/061278 A1 | 7/2004 |
| WO | WO 2004/090296 A1 | 10/2004 |
| WO | WO 2005/049984 A1 | 6/2005 |

\* cited by examiner

*Primary Examiner*—Binh Q. Tran
(74) *Attorney, Agent, or Firm*—Paul V. Keller

(57) ABSTRACT

A method is provided for regenerating a LNT in a diesel engine exhaust aftertreatment system. Typically, the aftertreatment system comprises a fuel reformer, a LNT, and a SCR catalyst in that order. Over the course of the regeneration, the concentration or flow rate of syn gas is increased, peaked, and then reduced. Preferably, the syn gas concentration or flow rate and the fuel reformer temperature are simultaneously controlled using at least a fuel injector and an engine intake air throttle. The pattern of increasing the syn gas concentration or flow rate during a first part of the regeneration and decreasing the syn gas concentration of flow rate in a latter part of the regeneration reduces the fuel penalty for the regeneration and improves the ammonia production rate as compared to a system in which the syn gas concentration or flow rate is essentially constant throughout the regeneration.

8 Claims, 2 Drawing Sheets

OPTIMAL FUEL PROFILES

BACKGROUND $NO_x$ emissions from diesel engines are an environmental problem. Several countries, including the United States, have long had regulations pending that will limit $NO_x$ emissions from trucks and other diesel-powered vehicles. Manufacturers and researchers have put considerable effort toward meeting those regulations.

In gasoline powered vehicles that use stoichiometric fuel-air mixtures, three-way catalysts have been shown to control $NO_x$ emissions. In diesel-powered vehicles, which use compression ignition, the exhaust is generally too oxygen-rich for three-way catalysts to be effective.

Several solutions have been proposed for controlling NOx emissions from diesel-powered vehicles. One set of approaches focuses on the engine. Techniques such as exhaust gas recirculation and partially homogenizing fuel-air mixtures are helpful, but these techniques alone will not eliminate NOx emissions. Another set of approaches remove NOx from the vehicle exhaust. These include the use of lean-burn $NO_x$ catalysts, selective catalytic reduction (SCR), and lean $NO_x$ traps (LNTs).

Lean-burn NOx catalysts promote the reduction of $NO_x$ under oxygen-rich conditions. Reduction of NOx in an oxidizing atmosphere is difficult. It has proven challenging to find a lean-burn $NO_x$ catalyst that has the required activity, durability, and operating temperature range. Lean-burn $NO_x$ catalysts also tend to be hydrothermally unstable. A noticeable loss of activity occurs after relatively little use. Lean-burn NOx catalysts typically employ a zeolite wash coat, which is thought to provide a reducing microenvironment. The introduction of a reductant, such as diesel fuel, into the exhaust is generally required and introduces a fuel economy penalty of 3% or more. Currently, peak NOx conversion efficiencies for lean-burn NOx catalysts are unacceptably low.

SCR generally refers to selective catalytic reduction of NOx by ammonia. The reaction takes place even in an oxidizing environment. The NOx can be temporarily stored in an adsorbent or ammonia can be fed continuously into the exhaust. SCR can achieve high levels of NOx reduction, but there is a disadvantage in the lack of infrastructure for distributing ammonia or a suitable precursor. Another concern relates to the possible release of ammonia into the environment.

To clarify the state of a sometime ambiguous nomenclature, it should be noted that in the exhaust aftertreatment art, the terms "SCR catalyst" and "lean NOx catalyst" are occasionally used interchangeably. Where the term "SCR" is used to refer just to ammonia-SCR, as it often is, SCR is a special case of lean NOx catalysis. Commonly when both types of catalysts are discussed in one reference, SCR is used with reference to ammonia-SCR and lean NOx catalysis is used with reference to SCR with reductants other than ammonia, such as SCR with hydrocarbons.

LNTs are devices that adsorb NOx under lean exhaust conditions and reduce and release the adsorbed NOx under rich exhaust conditions. A LNT generally includes a NOx adsorbent and a catalyst. The adsorbent is typically an alkaline earth compound, such as $BaCO_3$ and the catalyst is typically a combination of precious metals, such as Pt and Rh. In lean exhaust, the catalyst speeds oxidizing reactions that lead to NOx adsorption. In a reducing environment, the catalyst activates reactions by which adsorbed NOx is reduced and desorbed. In a typical operating protocol, a reducing environment will be created within the exhaust from time-to-time to regenerate (denitrate) the LNT.

Creating a reducing environment for LNT regeneration involves providing a reductant to the exhaust. Except where the engine can be run stoichiometric or rich, a portion of the reductant reacts within the exhaust to consume oxygen. The amount of oxygen to be removed by reaction with reductant can be reduced in various ways. If the engine is equipped with an intake air throttle, the throttle can be used. However, at least in the case of a diesel engine, it is generally necessary to eliminate some of the oxygen in the exhaust by combustion or reforming reactions with reductant that is injected into the exhaust.

The reactions between reductant and oxygen can take place in the LNT, but it is generally preferred for the reactions to occur in a catalyst upstream of the LNT, whereby the heat of reaction does not cause large temperature increases within the LNT at every regeneration.

Reductant can be injected into the exhaust by the engine or a separate fuel injection device. For example, the engine can inject extra fuel into the exhaust within one or more cylinders prior to expelling the exhaust. Alternatively, or in addition, reductant can be injected into the exhaust downstream of the engine.

U.S. Pat. Pub. No. 2004/0050037 (hereinafter "the '037 publication") describes an exhaust treatment system with a fuel reformer placed in the exhaust line upstream of a LNT. The reformer includes both oxidation and reforming catalysts. The reformer both removes excess oxygen and converts the diesel fuel reductant into more reactive reformate.

The operation of an inline reformer can be modeled in terms of the following three equations:

$$0.684 CH_{1.85} + O_2 \rightarrow 0.684 CO_2 + 0.632 H_2O \quad (1)$$

$$0.316 CH_{1.85} + 0.316 H_2O \rightarrow 0.316 CO + 0.608 H_2 \quad (2)$$

$$0.316 CO + 0.316 H_2O \rightarrow 0.316 CO_2 + 0.316 H_2 \quad (3)$$

wherein $CH_{1.85}$ represents an exemplary reductant, such as diesel fuel, with a 1.85 ratio between carbon and hydrogen. Equation (1) is exothermic complete combustion by which oxygen is consumed. Equation (2) is endothermic steam reforming. Equation (3) is the water gas shift reaction, which is comparatively thermal neutral and is not of great importance in the present disclosure, as both CO and $H_2$ are effective for regeneration.

The inline reformer of the '037 publication is designed to be rapidly heated and to then catalyze steam reforming. Temperatures from about 500 to about 700° C. are said to be required for effective reformate production by this reformer. These temperatures are substantially higher than typical diesel exhaust temperatures. The reformer is heated by injecting fuel at a rate that leaves the exhaust lean, whereby Reaction (1) takes place. After warm up, the fuel injection rate is increased to provide a rich exhaust. Depending on such factors as the exhaust oxygen concentration, the fuel injection rate, and the exhaust temperature, the reformer tends to either heat or cool as reformate is produced.

The fuel injection rate can be used to control the reformer temperature. If the reformer is heating, the fuel injection rate can be increased to increase the extent of endothermic Reaction (2) (endothermic steam reforming) occurs. The extent of Reaction (1) (exothermic complete combustion), which is limited by the exhaust oxygen concentration, remains essentially constant. If the reformer is cooling, the fuel injection rate can be decreased.

If the fuel injection rate alone is used to control the reformer temperature, the reductant concentration provided by the reformer will be essentially uncontrolled. In order to have some control over the reductant concentration, the exhaust oxygen concentration can be used as an additional control variable. The exhaust oxygen concentration in a diesel exhaust system can be controlled, within limits, using EGR, and intake air throttling. By controlling both the exhaust oxygen concentration and the fuel injection rate, the reformer temperature and the reductant concentration can be simultaneously controlled to predetermined values.

During denitrations, much of the adsorbed NOx is reduced to $N_2$, however, a portion of the adsorbed NOx is released without having been reduced and another portion of the adsorbed NOx is deeply reduced to ammonia. The NOx release occurs primarily at the beginning of the regeneration and is described as a NOx release spike. The ammonia production has generally been observed mostly towards the end of the regeneration.

U.S. Pat. No. 6,732,507 proposes a system in which a SCR catalyst is configured downstream of a LNT in order to utilize the ammonia released during denitration. The ammonia is utilized to reduce NOx slipping past the LNT and thereby improves conversion efficiency over a stand-alone LNT with no increase in fuel penalty or precious metal usage. U.S. Pat. No. 6,732,507 proposes regenerating the LNT using more reductant than required to reduce the adsorbed NOx with the idea of fueling ammonia production and thereby realizing NOx reduction over the SCR catalyst.

U.S. Pat. Pub. No. 2004/0076565 (hereinafter "the '565 publication") also describes hybrid systems combining LNT and SCR catalysts. In order to increase ammonia production, it is proposed to reduce the rhodium loading of the LNT. In order to reduce the NOx spike, it is proposed to eliminate oxygen storage capacity from the LNT. The theory is that the NOx spike results from reductant reacting with stored oxygen to produce heat, which causes the release of unreduced NOx at the beginning of each regeneration WO 2005/049984 also describes systems having LNT and SCR catalysts. Theorizing that ammonia formation is prohibited by residual oxygen present within the LNT patent, this application describes a process in which the LNT is flushed with an inert exhaust, which is an essentially stoichiometric or slightly lean mixture, in order to reduce residual oxygen and increase the degree of ammonia production during LNT regeneration.

U.S. Pat. No. 5,778,677 theorizes that the NOx spike is the result of an imbalance between reductant supply rate and the NOx release rate at the beginning of each regeneration. The proposed solution is to treat the NOx released at the start of the regeneration in a downstream SCR catalyst. Ammonia is provided downstream of the LNT for this purpose. It is proposed that this ammonia be produced on board by processing rich exhaust through a three-way catalyst in a separate exhaust passage. The ammonia-containing exhaust is combined with the LNT effluent prior to the exhaust entering the SCR catalyst.

In spite of advances, there continues to be a long felt need for an affordable and reliable exhaust treatment system that is durable, has a manageable operating cost (including fuel penalty), and is practical for reducing NOx emissions from diesel engines to a satisfactory extent in the sense of meeting U.S. Environmental Protection Agency (EPA) regulations effective in 2010 and other such regulations.

SUMMARY

One of the inventors' concepts relates to a method of regenerating a LNT (for NOx removal) in a diesel engine exhaust aftertreatment system. Typically, the aftertreatment system comprises a fuel reformer, a LNT, and a SCR catalyst in that order. Over the course of the regeneration, the concentration or flow rate of syn gas is increased, peaked, and then reduced. Preferably, the syn gas concentration or flow rate and the fuel reformer temperature are simultaneously controlled using at least a fuel injector and an engine intake air throttle. A pattern of increasing the reductant concentration or flow rate during a first part of the regeneration and decreasing the reductant concentration or flow rate in a latter part of the regeneration reduces the fuel penalty for the regeneration and improves the ammonia production rate as compared to a system in which the reductant concentration or flow rate is essentially constant throughout the regeneration. Using the inventors' concepts, greater ammonia production can be achieved than is possible with a constant reductant supply rate.

The primary purpose of this summary has been to present certain of the inventors' concepts in a simplified form to facilitate understanding of the more detailed description that follows. This summary is not a comprehensive description of every one of the inventors' concepts or every combination of the inventors' concepts that can be considered "invention". Other concepts of the inventors will be conveyed to one of ordinary skill in the art by the following detailed description together with the drawings. The specifics disclosed herein may be generalized, narrowed, and combined in various ways with the ultimate statement of what the inventors claim as their invention being reserved for the claims that follow.

DETAILED DESCRIPTION

Figure 2:
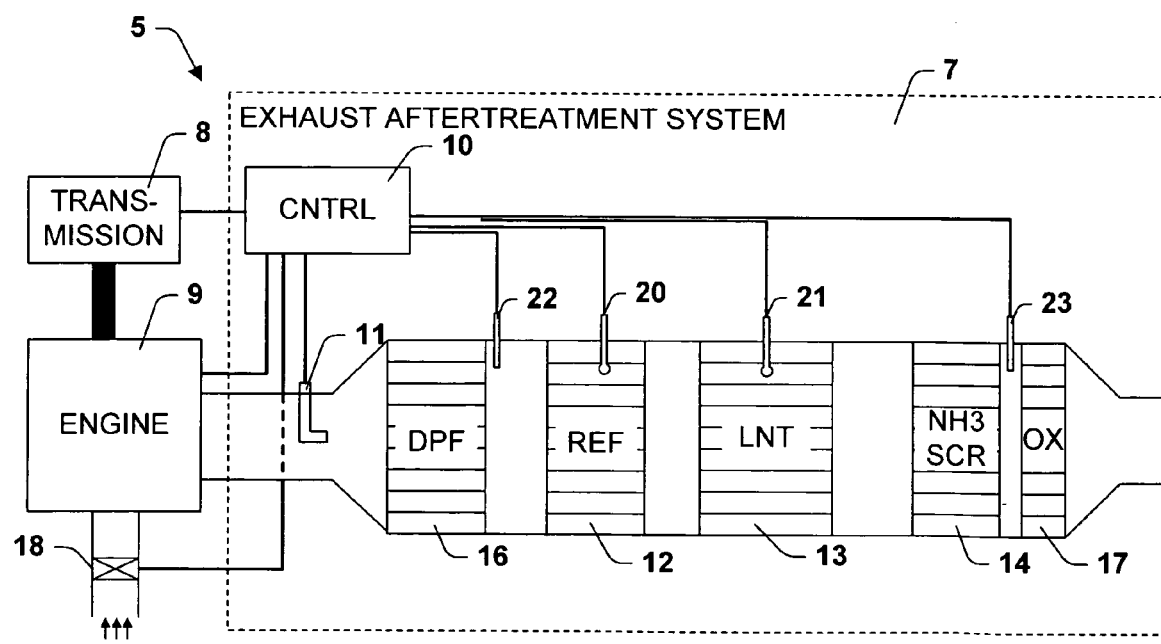
FIG. 2 is a schematic illustration of an exemplary system in which the inventors' concepts can be implemented.

FIG. 2 provides a schematic illustration of an exemplary power generation system 5 in which various concepts of the inventors can be implemented. The system 5 comprises an engine 9, a transmission 8, and an exhaust aftertreatment system 7. The exhaust aftertreatment system 7 includes a controller 10, a fuel injector 11, a fuel reformer 12, a lean NOx-trap (LNT) 13, an ammonia-SCR catalyst 14, a diesel particulate filter (DPF) 16, and a clean-up catalyst 17. The controller 10 receives data from several sources; include temperature sensors 20 and 21 and NOx sensors 22 and 23. The controller 10 may be an engine control unit (ECU) that also controls the transmission 8, an intake air throttle 18, an EGR valve, and the exhaust aftertreatment system 7 or may include several control units that collectively perform these functions.

The DPF 16 removes particulates from the exhaust. During lean operation (a lean phase), the LNT 13 adsorbs a portion of the exhaust NOx. The ammonia-SCR catalyst 14 may have ammonia stored from a previous regeneration of the LNT 13 (a rich phase). If the ammonia-SCR catalyst 14 contains stored ammonia, it removes an additional portion of the NOx from the lean exhaust. The clean-up catalyst 17 may serve to oxidize CO and unburned hydrocarbons remaining in the exhaust.

From time-to-time, the LNT 13 must be regenerated to remove accumulated NOx (denitrated). Denitration generally involves heating the reformer 12 to an operational temperature and then producing reformate. The reformer may be heated by injecting fuel at a sub-stoichiometric rate, whereby the exhaust remains lean and the injected fuel completely combusts in the reformer 12. Once combustion has heated the reformer 12, the fuel injection rate can be increased to make the exhaust rich, whereupon the reformer 12 consumes most of the oxygen from the exhaust and produces reformate by partial oxidation and steam reforming reactions. The reformate thus produced reduces NOx adsorbed in the LNT 13. Some of this NOx is reduced to $NH_3$, most of which is captured by the ammonia-SCR catalyst 14 and used to reduce NOx during a subsequent lean phase. The clean-up catalyst 17 oxidizes unused reductants and unadsorbed $NH_3$ using stored oxygen or residual oxygen remaining in the exhaust during the rich phases.

According to one of the inventors' concepts, the exhaust oxygen and reductant flow rates are controlled in order to regulate the temperature of the reformer 12 and provide a pre-determined reductant flow or concentration profile. The reductant profile is preferably designed to minimize the fuel penalty associated with regenerating the LNT 13. Part of this design typically involves increasing the ammonia production rate, in that if a greater fraction of the adsorbed NOx is converted to ammonia, the LNT 13 does not need to be regenerated as frequently.

The fuel injection rate required to achieve a target syn gas flow rate profile, $F_{total}$ is given by:

$$F_{total} = F_{combust} + F_{reform}/\eta \quad (4)$$

wherein $F_{combust}$ is the fuel flow rate require to combust the oxygen in the exhaust, $F_{reform}$ is the amount of fuel stoichiometrically required to provide the target amount of syn gas, and $\eta$ is the efficiency with which the fuel reformer 12 converts fuel to reformate once excess oxygen has been removed. The efficiency factor $\eta$ depends on the particular characteristics of the fuel reformer 12, among other factors. $F_{reform}$ is generally proportional to the target syn gas flow rate, with the proportionality being determined by a stoichiometry approximately as shown in Equation (2). $F_{combust}$ is determined by the exhaust oxygen concentration and a stoichiometry approximately as shown in Equation (1). Accordingly, the fuel injection rate is determined from Equation (4) based on the target syn gas flow rate and the exhaust oxygen concentration. An iterative calculation may be used if the efficiency factor $\eta$ is determined by a complex relationship.

The heating rate of the fuel reformer 12 is given by $$V_{ref} * C_{p,\,ref} * dT_{ref}/dt = C_{p,\,exh} * F_{exh} * (T_{ref} - T_{exh}) + Q_{comb} + Q_{ref} \quad (5)$$

wherein the term on the left is the reformer heating rate multiplied by the reformer heat capacity, the first term on the right is the heat capacity of the exhaust gas multiplied by the difference between the temperature of the exhaust leaving the reformer (approximately the same as the reformer temperature) and the temperature of the exhaust entering the reformer, the second term on the right is the heat generated by complete combustion, and the third term on the right is the heat generated by steam reforming (a negative number).

The heating rate of the fuel reformer is controlled through the engine operating parameters based on Equation (5). The first term on the right hand side of Equation (5) can be determined once the exhaust flow rate, $F_{exh}$, and the exhaust temperature, $T_{exh}$, are known. The second term can be evaluated from the exhaust oxygen concentration and the heat of Reaction (1), if sufficient fuel is injected to produce reformate. The third term can be determined from $F_{reform}$ and the heat of Reaction (2). Accordingly, for any given set of engine operating parameters and a target syn gas flow profile, all the terms on the right hand side of Equation (5) are determined. The set of parameters that gives an acceptable reformer heating rate without unduly affecting the operation of the engine 9 can be selected.

There are various parameters relating to the operation of the engine 9 that may be controlled in order to influence the reformer heating rate while maintaining the engine 9's power output. These parameters include, for example, one or more the degree of opening in an engine intake air throttle, the transmission gear ratio, and the degree of opening of an engine EGR valve. The selection of these operating parameters will affect equation (5) through the exhaust flow rate $F_{exh}$, the exhaust temperature $T_{exh}$, and the exhaust oxygen concentration, which determines $Q_{comb}$ when the fuel injection rate is sufficiently high to produce reformate.

The foregoing equations were presented for calculating the fuel injection rate and engine operating parameters, e.g. degree of throttling, required to achieve a given syn gas flow rate and reformer temperature control. These equations can be modified to give the fuel injection rate and engine operating parameters to achieve a target syn gas concentration profile or a corresponding fuel to air ratio profile.

There are several possible reformer temperature control objectives. One possibility is to maintain a constant reformer temperature. Another is to maintain the reformer temperature increasing at a sufficiently slow rate that the reformer 12 does not overheat before the regeneration is completed. If the reformer 12 does begin to overheat, the regeneration process can be stopped temporarily while the reformer 12 cools, but this tends to increase the regeneration fuel penalty. It may be desirable to have the reformer temperature increasing somewhat over the course of the regeneration. For example, reformate production and regeneration may begin as soon as the reformer 12 has reached a minimum temperature. If this minimum temperature is below the optimal temperature for the reformer 12, then it would be desirable to allow the reformer 12 to heat as the regeneration proceeds. There may be a range of reformer temperatures and heating rates which are acceptable. In such a case, the engine operating parameters may be optimized within the limits of the acceptable temperature variations. For example, the engine intake air may be throttled to the minimum extent required to keep the reformer 12 within an acceptable operating temperature range over the course of the regeneration in order that the operation of the engine 9 be subject to a minimum perturbation.

When a regeneration is due, the reformer 12 is first heated to a temperature at which the reformer 12 can effectively produce reformate. There is an optimal fuel profile and an optimal control of engine operating parameters to bring about this heating with a minimum fuel cost. Generally, this optimum involves gradually increasing the fuel injection rate. Initially, when the reformer 12 is cool, combustion proceeds slowly and a rapid fuel injection would result in a large waste of fuel. As the reformer heats, it becomes catalytically more active and the fuel injection rate can be increased without excessive fuel wastage. This heating phase is characterized by fuel injection at rates that leave the exhaust lean.

A preferred syn gas concentration or flow rate profile is characteristically highest in the midst of the regeneration, and is relatively lower at the beginning of the regeneration and at the end of the regeneration. Typically, syn gas flow rate begins relatively low, increases to a maximum, and then decreases toward the end.

A theory that explains the functionality of the inventor's preferred reductant flow rate or concentration profiles is that the reductant supply rate approximately matches the NOx release rate. At the beginning of regeneration, reductant is consumed by reaction with oxygen stored in the LNT. Until this stored oxygen is removed, reduction of NOx is not effective, particularly not deep reduction of NOx to $NH_3$.

Regeneration does not take place uniformly throughout the LNT. Oxygen is first removed near the entrance. The point of oxygen removal is believed to form a front that moves towards the exit of the LNT. As this front moves through the LNT, a greater and greater portion of the LNT is essentially free of stored oxygen and begins to undergo release of stored NOx. As this portion of the LNT increases, the NOx release rate also increases. By progressively increasing the reductant supply rate, this release rate can be approximately matched by the reductant supply rate while oxygen is being removed at a relatively constant speed. Eventually, after essentially all of the stored oxygen is removed and the NOx release rates in the oxygen-free zones are ebbing due to depleting reserves of stored NOx, the overall NOx release rate decreases. By decreasing the reductant supply rate toward the end of the regeneration, the reductant supply rate can be approximately matched to the NOx release rate in the latter part of the regeneration as well.

Matching the reductant supply rate to the NOx release rate has at least two beneficial effects. One is the NOx slip is reduced. The other is that ammonia production is increased. Ammonia production is increased both because more NOx is available for reduction and because more reductant is present when NOx release rates are highest (in the middle of regeneration). An excess of reductant increases the portion of NOx that is deeply reduced to ammonia. By varying the reductant supply rate as described herein, it is possible to achieve a greater ammonia yield per unit reductant than is possible with any uniform reductant supply rate. Also, a greater fraction of the stored NOx can be reduced to ammonia.

Figure 1:
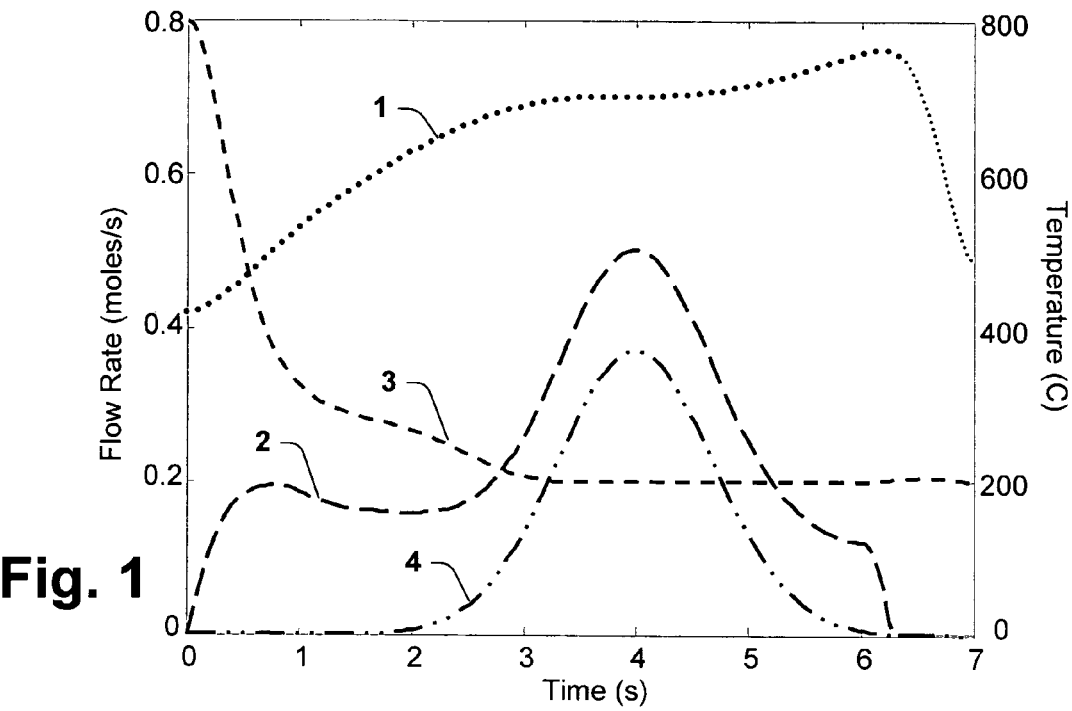
FIG. 1 is a plot showing exemplary fuel injection and oxygen flow profiles along with the resulting syn gas flow rate and reformer temperature profiles.

FIG. 1 provides an exemplary fuel injection profile for providing a regeneration with a low fuel penalty as compared to a prior art fuel injection profile, which would provide an essentially constant reductant flow rate throughout the regeneration. Line 1 is the reformer temperature, line 2 is the hydrocarbon reductant flow rate (fuel injection rate upstream of the reformer, g/min), line 3 is the exhaust oxygen flow rate (before the reformer), and line 4 is the syn gas flow rate (after the reformer).

Initially the reformer temperature is about 400° C. The reformer is heated under lean exhaust conditions to about 600° C., at which point the exhaust is made rich and reformate generation begins (as shown by line 4). The fuel reformer continues to heat to about 750° C. as reformate is produced and the LNT regenerated under rich exhaust conditions.

For a portion of the lean period (before about 2 seconds) during which the reformer is heated, the fuel injection rate indicated by line 2 is as high or higher than it is during certain points during which the reformer is operated under rich conditions (after about 2 seconds). The exhaust is lean in spite of the higher fuel injection rate due to the higher oxygen flow rate during the warm-up period, which is indicated by line 3.

The oxygen flow rate can be reduced by throttling the engine air intake. It may not be possible or practical to throttle the engine to a high degree over a short period of time. Accordingly, increasing the degree of throttling during the lean warm-up phase and thereby decreasing the flow of oxygen is beneficial in preparing the reformer for the rich regeneration phase, aside from any beneficial affects the throttling may have on the fuel penalty for heating the reformer.

Over the rich phase, the fuel injection curve 2, and the related syn gas curve 4, both have nearly Gaussian shapes. This exact shape is not critical. The qualities of starting at a low value, increasing steadily to a peak value, and decreasing steadily to another low value, are the characteristic qualities of this example.

Figure 3:
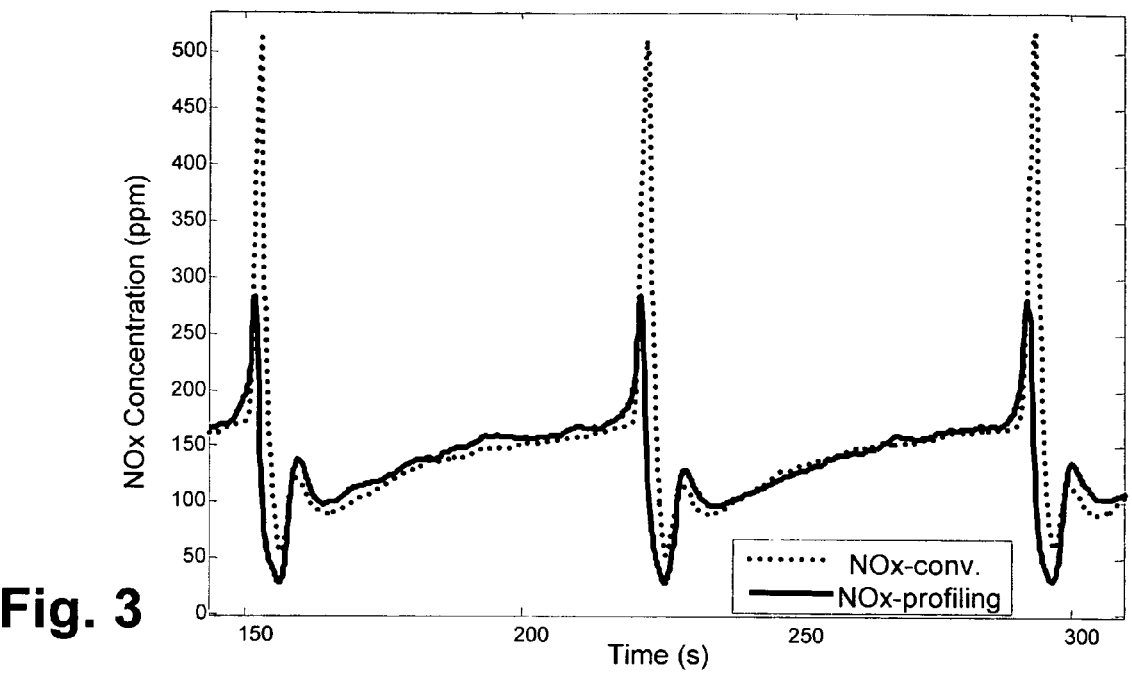
FIG. 3 is a plot comparing NOx slip rates from a LNT using a conventional reductant flow profile and a reductant flow profile as conceived by the inventors.

FIG. 3 compares the NOx release rate observed using the fuel profile of FIG. 1 with the NOx release rate observed using a conventional constant fueling rate. The figure shows substantial reductions in the NOx release spikes that occur with each LNT regeneration.

Figure 4:
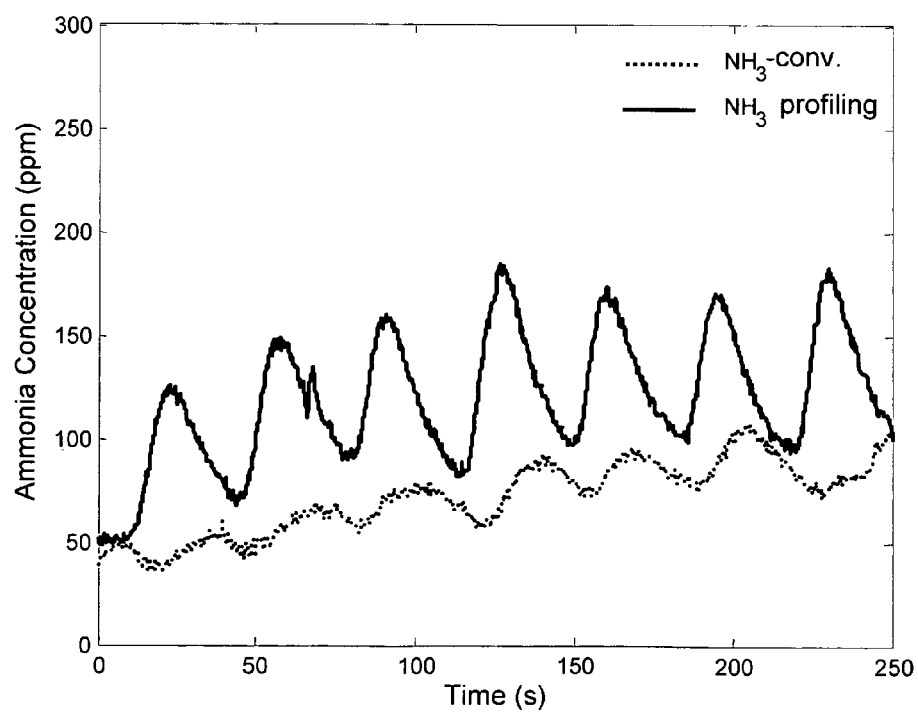
FIG. 4 is a plot comparing ammonia production rates from a LNT using a conventional reductant flow profile and a reductant flow profile conceived by the inventors.

FIG. 4 compares the ammonia production rate observed using the fuel profile of FIG. 1 with the ammonia production rate observed using a conventional constant fueling rate. Considerably more ammonia is produced using the profile of the invention. Using the reductant profile conceived by the inventors, substantially more ammonia is produced per unit reductant and per unit adsorbed NOx released than is possible using any constant reductant supply rate; a greater fraction of the NOx removed from storage is reduced to ammonia when using the fuel profiles conceived by the inventors. The inventors believe that essentially all the ammonia is produced during the brief rich phases and that the attenuated ammonia release rates shown in FIG. 4 are a result of either adsorption and gradual release of generated ammonia or an artifact of the equipment used to measure the ammonia release rates.

The time at which to regenerate the LNT can be determined by any suitable method. Examples of methods of determining when to begin a regeneration include initiating a regeneration upon reaching a threshold in any of a NOx concentration in the exhaust, a total amount of NOx emissions per mile or brake horsepower-hour over a previous period or since the last regeneration, a total amount of engine out NOx since the last regeneration, an estimate of NOx loading in the LNT 13, a reduction in NOx conversion efficiency below a predetermined value, and an estimate of adsorption capacity left in the LNT 13. Regeneration can be periodic or determined by direct feed forward or feedback control. Regeneration can also be opportunistic, being triggered by engine operating conditions that favor low fuel penalty regeneration. A threshold for regeneration can be varied to give a trade off between urgency of the need to regenerate and favorability of the current conditions for regeneration.

From time-to-time, the LNT 13 must also be regenerated to remove accumulated sulfur compounds (desulfated). Desulfation involves heating the reformer 12 to an operational temperature, heating the LNT 13 to a desulfating temperature, and providing the heated LNT 13 with a reducing atmosphere. Desulfating temperatures vary, but are typically in the range from about 500 to about 800° C., with optimal temperatures typically in the range from about 650 to about 750° C. Below a minimum temperature, desulfation is very slow. Above a maximum temperature, the LNT 13 may be damaged.

The primary means of heating the LNT 13 is heat convection from the reformer 12. To generate this heat, fuel can be supplied to the reformer 12 under lean conditions, whereby the fuel combusts in the reformer 12. During desulfation of the LNT 13, the fuel injection rate and the exhaust conditions can be controlled as described above for the LNT 13. A preferred reductant concentration profile for desulfating the LNT 13 includes a relatively low reductant concentration maintained over an extended period; the amount of sulfur removed per unit time during desulfation is much less than the amount of NOx removed per unit time during denitration, thus once excess oxygen has been removed, only a small steady flow of reductant is required.

While the engine 9 is preferably a compression ignition diesel engine, the various concepts of the inventor are applicable to power generation systems with lean-burn gasoline engines or any other type of engine that produces an oxygen rich, NOx-containing exhaust. For purposes of the present disclosure, NOx consists of NO and $NO_2$.

The transmission 8 can be any suitable type of transmission. The transmission 8 can be a conventional transmission such as a counter-shaft type mechanical transmission, but is preferably a CVT. A CVT can provide a much larger selection of operating points than a conventional transmission and generally also provides a broader range of torque multipliers. The range of available operating points can be used to control the exhaust conditions, and thus the temperature of the reformer 12. For a given power demand, the torque multiplier that gives the best operating point in terms of a given control objective, such as minimizing the exhaust oxygen concentration, can be selected.

In general, a CVT will also avoid or minimize interruptions in power transmission during shifting. Examples of CVT systems include hydrostatic transmissions; rolling contact traction drives; overrunning clutch designs; electrics; multi-speed gear boxes with slipping clutches; and V-belt traction drives. A CVT may involve power splitting and may also include a multi-step transmission.

A preferred CVT provides a wide range of torque multiplication ratios, reduces the need for shifting in comparison to a conventional transmission, and subjects the CVT to only a fraction of the peak torque levels produced by the engine. This can be achieved using a step-down gear set to reduce the torque passing through the CVT. Torque from the CVT passes through a step-up gear set that restores the torque. The CVT is further protected by splitting the torque from the engine, and recombining the torque in a planetary gear set. The planetary gear set mixes or combines a direct torque element transmitted from the engine through a stepped automatic transmission with a torque element from a CVT, such as a band-type CVT. The combination provides an overall CVT in which only a portion of the torque passes through the band-type CVT.

The fuel injector 11 can be of any suitable type. Preferably, it provides the fuel in an atomized or vaporized spray. The fuel may be injected at the pressure provided by a fuel pump for the engine 9. Preferably, however, the fuel passes through a pressure intensifier operating on hydraulic principles to at least double the fuel pressure from that provided by the fuel pump to provide the fuel at a pressure of at least about 4 bar. In the preferred embodiment, an electronically controlled fuel injector with a high-degree of response and resolution control is desirable.

A fuel reformer is a device that converts heavier fuels into lighter compounds without fully combusting the fuel. A fuel reformer can be a catalytic reformer or a plasma reformer. Preferably, the reformer 12 is a partial oxidation catalytic reformer comprising a steam reforming catalyst. Examples of reformer catalysts include precious metals, such as Pt, Pd, or Ru, and oxides of Al, Mg, and Ni, the later group being typically combined with one or more of CaO, $K_2O$, and a rare earth metal such as Ce to increase activity. A reformer is preferably small in size as compared to an oxidation catalyst or a three-way catalyst designed to perform its primary functions at temperatures below 450° C. The reformer is generally operative at temperatures from about 450 to about 1100° C.

The LNT 13 can comprise any suitable NOx-adsorbing material. Examples of NOx adsorbing materials include oxides, carbonates, and hydroxides of alkaline earth metals such as Mg, Ca, Sr, and Ba or alkali metals such as K or Cs. Further examples of NOx-adsorbing materials include molecular sieves, such as zeolites, alumina, silica, and activated carbon. Still further examples include metal phosphates, such as phosphates of titanium and zirconium. Generally, the NOx-adsorbing material is an alkaline earth oxide. The absorbent is typically combined with a binder and either formed into a self-supporting structure or applied as a coating over an inert substrate.

The LNT 13 also comprises a catalyst for the reduction of NOx in a reducing environment. The catalyst can be, for example, one or more transition metals, such as Au, Ag, and Cu, group VIII metals, such as Pt, Rh, Pd, Ru, Ni, and Co, Cr, or Mo. A typical catalyst includes Pt and Rh. Precious metal catalysts also facilitate the adsorbent function of alkaline earth oxide absorbers.

Adsorbents and catalysts according to the present invention are generally adapted for use in vehicle exhaust systems. Vehicle exhaust systems create restriction on weight, dimensions, and durability. For example, a NOx adsorbent bed for a vehicle exhaust system must be reasonably resistant to degradation under the vibrations encountered during vehicle operation.

The ammonia-SCR catalyst 15 is a catalyst effective to catalyze reactions between NOx and $NH_3$ to reduce NOx to $N_2$ in lean exhaust. Examples of SCR catalysts include oxides of metals such as Cu, Zn, V, Cr, Al, Ti, Mn, Co, Fe, Ni, Pd, Pt, Rh, Rd, Mo, W, and Ce, zeolites, such as ZSM-5 or ZSM-11, substituted with metal ions such as cations of Cu, Co, Ag, Zn, or Pt, and activated carbon. Preferably, the ammonia-SCR catalyst 16 is designed to tolerate temperatures required to desulfate the LNT 13.

The particulate filter 16 can have any suitable structure. Examples of suitable structures include monolithic wall flow filters, which are typically made from ceramics, especially cordierite or SiC, blocks of ceramic foams, monolith-like structures of porous sintered metals or metal-foams, and wound, knit, or braided structures of temperature resistant fibers, such as ceramic or metallic fibers. Typical pore sizes for the filter elements are about 10 μm or less.

The inclusion of, and the location of, the DPF 16 is optional. Between the reformer 12 and the LNT 13, the DPF 16 can serve to protect the LNT 13 from temperature excursions associated with the operation of the reformer 12. Between the LNT 13 and the ammonia-SCR catalyst 14, the DPF 16 can help protect the SCR catalyst 14 from desulfation temperatures. Optionally, one or more of the reformer 12, the LNT 13, and the ammonia-SCR catalyst 14 is integrated as a coating or within the structure of the DPF 16.

The DPF 16 is regenerated to remove accumulated soot. The DPF 16 can be of the type that is regenerated continuously or intermittently. For intermittent regeneration, the DPF 16 is heated, using a reformer 12 for example. The DPF 16 is heated to a temperature at which accumulated soot combusts with $O_2$. This temperature can be lowered by providing the DPF 16 with a suitable catalyst. After the DPF 16 is heated, soot is combusted in an oxygen rich environment.

For continuous regeneration, the DPF 16 may be provided with a catalyst that promotes combustion of soot by both $NO_2$ and $O_2$. Examples of catalysts that promote the oxidation of soot by both $NO_2$ and $O_2$ include oxides of Ce, Zr, La, Y, Nd, Pt, and Pd. To completely eliminate the need for intermittent regeneration, it may be necessary to provide an additional oxidation catalyst to promote the oxidation of NO to $NO_2$ and thereby provide sufficient $NO_2$ to combust soot as quickly as it accumulates. Where regeneration is continuous, the DPF 16 is suitably placed upstream of the reformer 12. Where the DPF 16 is not continuously regenerated, it is generally positioned downstream of the reformer 12.

The clean-up catalyst 17 is preferably functional to oxidize unburned hydrocarbons from the engine 9, unused reductants, and any $H_2S$ released from the NOx absorber-catalyst 13 and not oxidized by the ammonia-SCR catalyst 14. Any suitable oxidation catalyst can be used. To allow the clean-up catalyst 17 to function under rich conditions, the catalyst may include an oxygen-storing component, such as ceria. Removal of $H_2S$, where required, may be facilitated by one or more additional components such as NiO, $Fe_2O_3$, $MnO_2$, CoO, and $CrO_2$.

The invention as delineated by the following claims has been shown and/or described in terms of certain concepts, components, and features. While a particular component or feature may have been disclosed herein with respect to only one of several concepts or examples or in both broad and narrow terms, the components or features in their broad or narrow conceptions may be combined with one or more other components or features in their broad or narrow conceptions wherein such a combination would be recognized as logical by one of ordinary skill in the art. Also, this one specification may describe more than one invention and the following claims do not necessarily encompass every concept, aspect, embodiment, or example described herein.

The invention claimed is:

1. A method of denitrating a LNT in an exhaust aftertreatment system, comprising:
   treating an exhaust stream from an internal combustion engine using an exhaust aftertreatment system that passes the exhaust through a fuel reformer and then the LNT;
   controlling a rate of fuel injection into the exhaust upstream from the fuel reformer to make the fuel-air ratio of the exhaust that enters the fuel reformer and then flows to the LNT a first value which is rich and at which the fuel reformer produces syn gas and denitration of the LNT begins; and
   controlling the fuel injection rate to progressively increase the fuel-air ratio of the exhaust entering the fuel reformer to a second value over the course of the denitration, whereby the rate of syn gas production by the fuel reformer and the concentration of syn gas in the exhaust entering the LNT are increased;
   wherein the control provides a predetermined progressive increase to the fuel-air ratio over a first part of the denitration from the first value, which is low, to the second value, which is substantially higher than the first value.

2. The method of claim 1, further comprising:
   controlling the rate of fuel injection to increase the fuel-air ratio through a first series of values increasing from the first value to the second value; and
   controlling the rate of fuel injection to decrease the fuel-air ratio through a second series of values decreasing from the second value to a third value at which the exhaust is rich but at a substantially fuel-air ratio than at the second value.

3. The method of claim 1, wherein the exhaust aftertreatment system comprises the fuel reformer, the LNT, and a SCR catalyst configured within an exhaust line in that order.

4. The method of claim 1, further comprising controlling an exhaust oxygen concentration to regulate a temperature of the fuel reformer while progressively increasing the fuel-air ratio.

5. A method of denitrating a LNT in an exhaust stream from an internal combustion engine that flows through a fuel reformer and then the LNT, comprising:
   predetermining a profile of progressively and steadily increasing a flow rate or concentration of reductant supplied to the LNT over a course of a denitration;
   denitrating the LNT by injecting fuel into the internal combustion engine exhaust that flows to the fuel reformer, whereby the exhaust is made rich, the fuel reformer consumes oxygen in the exhaust, and the fuel reformer produces a reductant comprising reformate which flows to and regenerates the LNT; and
   controlling the fuel injection rate to progressively and steadily increase the fuel injection rate over the course of the denitration according to the predetermined profile.

6. The method of claim 5, further comprising:
   controlling the fuel injection rate to increase the reductant concentration through a first series of values increasing from a first value to a second value; and
   controlling the fuel injection rate to decrease the reductant concentration through a second series of values decreasing from the second value to a third value.

7. The method of claim 5, wherein the exhaust stream passes through the fuel reformer, the LNT, and a SCR catalyst configured within an exhaust line in that order.

8. The method of claim 5, further comprising controlling a degree of intake air throttling for a diesel engine supplying the exhaust stream in order to simultaneously control a temperature of the fuel reformer while controlling the fuel injection rate to progressively and steadily increase the fuel injection rate over the course of the denitration according to the predetermined profile.

* * * * *